UNITED STATES PATENT OFFICE.

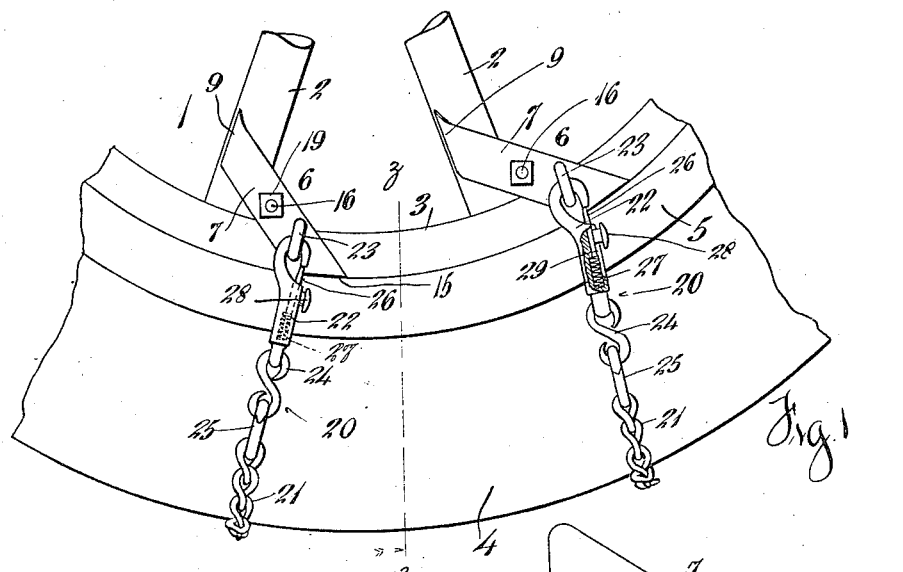
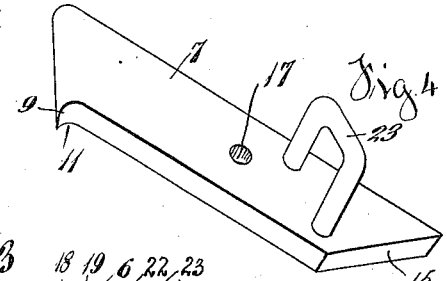
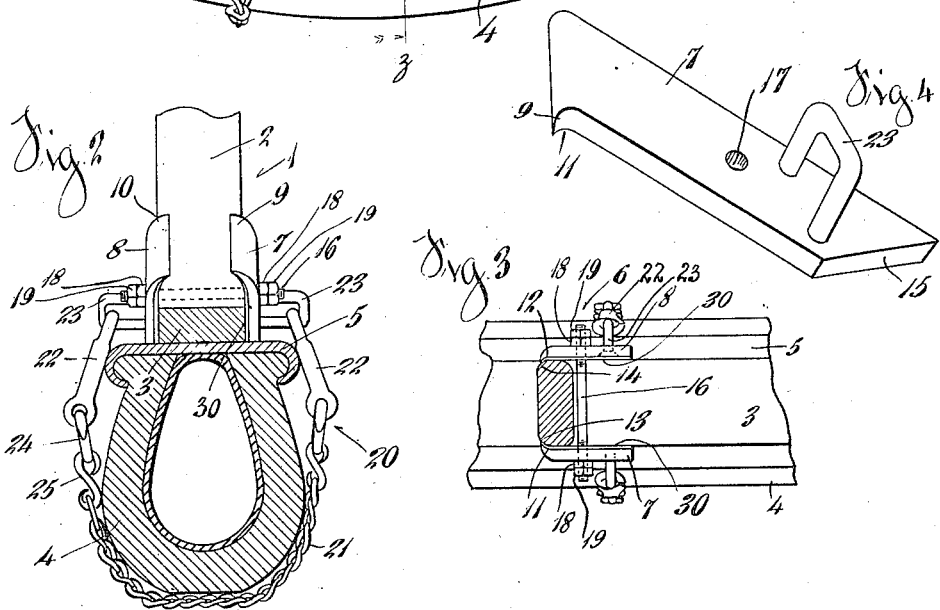
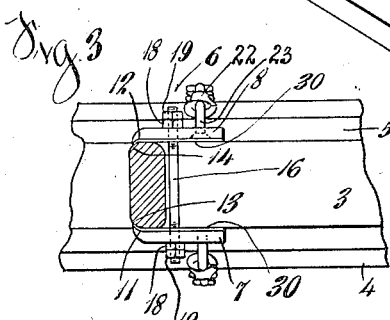
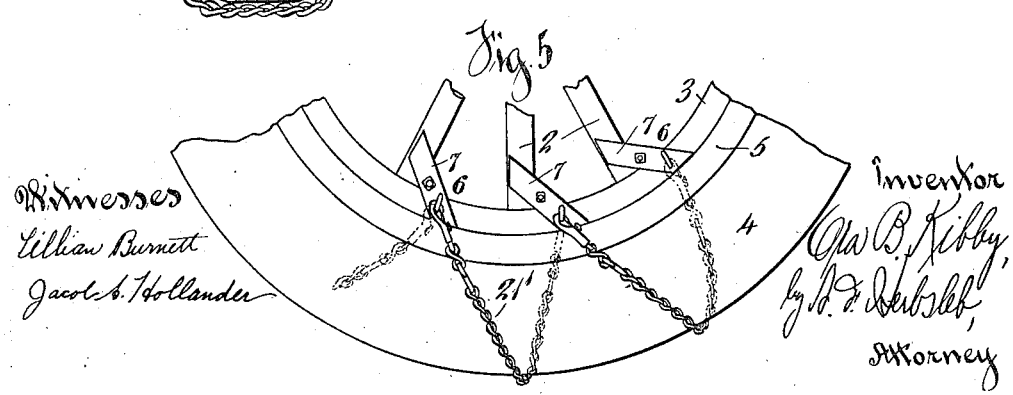

ORA B. KIBBY, OF CINCINNATI, OHIO, ASSIGNOR OF ONE-HALF TO EDGAR J. MOCH, OF CINCINNATI, OHIO.

ANTISKIDDING DEVICE FOR VEHICLE-WHEELS.

987,806.                 Specification of Letters Patent.      Patented Mar. 28, 1911.

Application filed February 23, 1910. Serial No. 545,335.

*To all whom it may concern:*

Be it known that I, ORA B. KIBBY, a citizen of the United States, residing at Cincinnati, in the county of Hamilton and State of Ohio, have invented certain new and useful Improvements in Antiskidding Devices for Vehicle-Wheels, of which the following is a specification.

My invention relates to anti-skidding devices for vehicle wheels, especially such as are used in connection with pneumatic tires of automobiles.

My invention consists in a flexible member arranged to be received about the periphery of the vehicle wheel, and novel means for attaching the same to the wheel, and the invention will be readily understood from the following description and claims, and from the drawings, in which latter:

Figure 1 is a side elevation of my improved device shown applied to a wheel the wheel being partly broken away. Fig. 2 is an end view of the same, the wheel being shown in section on the line z—z of Fig. 1. Fig. 3 is a plan view of the same. Fig. 4 is a perspective view of one of the clamp-plates; and, Fig. 5 is a side elevation of my improved device, showing the tire-chain diagonally arranged.

1 represents so much of a vehicle wheel as is necessary to illustrate my invention, the same being shown as a wheel having a pneumatic tire.

2 are the spokes of the wheel, 3 the felly, 4 a usual pneumatic tire, and 5 the rigid rim of the latter, which in practice is usually of metal and is received annularly about the periphery of the felly.

6 represents clamping devices. These clamping devices comprise clamp-plates arranged in pairs, the clamp-plates being shown at 7 and 8. They are arranged to be clamped by lateral pressure at the sides of a spoke and felly, and have bearing on the rim 5, the plates of the respective pairs being provided with inwardly projecting flanges 9 10 preferably formed up from the plates with inner roundings 11 12, forming bearings for the spokes, arranged to fit the roundings 13 14 at the sides of the spokes, the flanges projecting inwardly or toward each other, preferably at the rear face of the spoke, and thereby aiding in bracing the plates. The other ends of the respective plates are provided with inclined bearing-faces 15 arranged to bear against the inner annular face of the rigid rim 5. 16 is a bolt received through apertures 17 in the respective plates of the pairs of plates and has clamp-nuts 18 and jam-nuts 19 at the respective ends thereof, this construction permitting the bolt to project selectively at either side of the wheel, and forms a clamping member for clamping the spoke and felly between the plates.

20 is a flexible transverse traction member arranged to be releasably secured to the clamping device, and in the form shown consists of a chain 21 having snap-hooks 22 at the respective ends thereof, arranged to be hooked into eyes 23 on the clamp-plates. The snap-hooks are preferably secured at the respective ends of the chain by means of S-links 24 25. Each of the snap-hooks may be provided with a tongue 26 forced outwardly by a spring 27, the tongue having a thumb-piece 28 slidable in a slot 29 for locking the snap-hook in place. If desired, each of the clamp-plates may be provided with an inner lining 30 which may be of suitable cushioning material and is received between the respective clamp-plates and the spoke and felly of the wheel.

The attaching devices are arranged to be rigidly secured to the wheel, and are intended to remain in place when once attached. The chains are cross-chains which are received transversely about the outer face of the tire and are releasably secured to the clamping devices by means whereby the cross-chains may be readily, instantly and securely attached and also detached from the clamping device. Any one or more of the cross-chains may be attached, depending on the road conditions, and the ready means by which they are attached and detached permits the chains to be attached and removed readily and at pleasure, so that all road conditions may be readily met. The tire-chains may be clasped to mating plates, as shown in Figs. 1, 2 and 3, or may be diagonally arranged, as shown at 21', between adjacent clamping devices, as shown in Fig. 5. The clamp-plates are clamped by lateral pressure toward the sides of the spoke and felly adjacent the attachment of the spoke to the felly, the mating clamping plates for the respective spokes extending diagonally of said respective spokes at the sides of said respective spokes and the felly.

The bolt is received in the angle between the spoke and felly.

My improved construction strengthens the wheel, is comparatively small, strong and is neat in appearance. The chain is preferably arranged somewhat slack and the links thereof provide flexibility, so that the same points on the pneumatic tire are not always contacted by the chain, thereby increasing the life of the tire.

Having thus fully described my invention, what I claim as new and desire to secure by Letters Patent is:

1. In an anti-skidding device for vehicle wheels, the combination of a pair of side clamp-plates having bearing-faces thereon for the sides of a spoke and felly of a wheel adjacent to the joint between said spoke and felly, and arranged for spanning the angle between said spoke and felly adjacent to said joint, clamping means between said mated clamp-plates acting laterally on said clamp-plates for clamping said spoke and felly with lateral pressure between said clamp-plates, and a flexible tread-member having releasable attachment with said plates, substantially as described.

2. In an anti-skidding device for vehicle wheels, the combination of side-clamp-plates mated in pairs and having bearing faces thereon for the spoke, felly and inner face of the tire-rim of the wheel, said mated clamp-plates spanning the angle between said spoke and felly with said spoke and felly between said mated clamp-plates and said clamp-plates braced against said inner face of said tire-rim, clamping members between said mated clamp-plates in the angle between said spoke and felly acting with lateral pressure on said spoke and felly for clamping said spoke and felly between said mated clamp-plates, a tread-chain, and releasable securing means between the latter and said clamp-plates, substantially as described.

3. In an anti-skidding device for vehicle wheels, the combination with the spokes and felly of the wheel, of clamping devices comprising side clamp-plates arranged in pairs extending diagonally from a spoke and received at the respective sides of said spoke and felly, said side clamp-plates at one end thereof having bearings for said spoke projecting toward each other at one face of said spoke, a bolt located at the other face of said spoke in the angle between said spoke and felly for clamping said spoke and felly between said plates, a tire-chain, and snap-hooks between said tire-chain and clamp-plates for releasably securing said tire-chain to said clamp-plates, substantially as described.

4. In an anti-skidding device for a vehicle wheel, the combination with the spokes and felly of the wheel, of clamping devices comprising side clamp-plates arranged in pairs extending diagonally from a spoke and received at the respective sides of said spoke and felly adjacent the joint between said spoke and felly, cushions between said clamp-plates and said spoke and felly, said clamp-plates being provided at one end with bearings for said spoke projecting toward each other and located at one face of said spoke, and a clamping member located at the other face of said spoke between the said plates in the angle between said spoke and felly for clamping said spoke and felly between said plates, a tire-chain, and releasable securing means between said tire-chain and clamp-plates, substantially as described.

5. In an anti-skidding device for a vehicle wheel, the combination with the spokes, felly and tire of the wheel, said tire comprising an inner rigid rim, of clamping devices comprising side clamp-plates arranged in pairs extending diagonally from a spoke and received at the respective sides of said spoke and felly adjacent the joint between said spoke and felly, said clamp-plates being provided at one end with bearings for said spoke projecting toward each other, said clamp-plates being provided at their other ends with inclined bearing-faces for the inner face of said rigid rim, a clamping member between said plates located in the angle between said spoke and felly, a tire-chain received about the outer face of said tire, and releasable securing means between said tire-chain and clamp-plates, substantially as described.

In testimony whereof, I have signed my name hereto in the presence of two subscribing witnesses.

ORA B. KIBBY.

Witnesses:
CONSTANT SOUTHWORTH,
LILLIAN BURNETT.